Jan. 21, 1969  K. L. WICHMAN  3,422,825
APPARATUS FOR CLEANING AND COATING ARTICLES
Filed March 10, 1967  Sheet 1 of 2

INVENTOR
KENNETH L. WICHMAN

ATTORNEYS

INVENTOR
KENNETH L. WICHMAN

ATTORNEYS

United States Patent Office

3,422,825
Patented Jan. 21, 1969

3,422,825
APPARATUS FOR CLEANING AND COATING ARTICLES
Kendall L. Wichman, St. Clair Shores, Mich., assignor to The R. C. Mahon Company, Detroit, Mich., a corporation of Michigan
Filed Mar. 10, 1967, Ser. No. 622,299
U.S. Cl. 134—105          8 Claims
Int. Cl. B08b *3/10;* B08b *15/00;* B05c *3/10*

ABSTRACT OF THE DISCLOSURE

A tank which contains one or more liquid materials for cleaning and coating articles that are moved through the tank. The liquid material is heated and contains a solvent which forms solvent vapors above the liquid. Condensing means are provided above the liquid to condense the vapors. One or more troughs are provided within the tank. Each of the troughs has a plurality of longitudinally spaced downwardly extending projections having openings therein through which bolts that are fixed on the sides of the tank extend. Nuts are threaded on the bolts to hold the trough removably on the tank. As need for adjustment or replacement of the trough occurs due to corrosion, the trough can be easily removed without damaging the tank.

*Background of the invention*

This invention relates to apparatus for treating articles and particularly apparatus for cleaning and coating articles. It has heretofore been common to treat and coat articles by moving them through a tank of liquid cleaning and coating materials that comprise solvents such as trichloroethylene, perchloroethylene, carbon tetrachloride and other chlorinated hydrocarbons. The liquid materials are heated creating solvent vapors above the liquid and condensing means are provided for condensing these vapors to prevent the vapors from passing to the atmosphere and to collect the material for reuse. It is common to provide troughs within the tanks for collecting the condensed vapors. Conventionally these troughs form a part of the tank walls. As the position of the troughs may need adjustment or as they commonly corrode in use, it is essential to shut down the apparatus and reconstruct the apparatus in order to adjust the troughs or correct the damage.

Among the objects of the present invention are to provide an apparatus which includes a novel trough construction whereby troughs can be either adjusted or removed and replaced quickly and with a minimum of labor.

*Summary*

The apparatus disclosed herein comprises a tank which contains one or more liquid materials for cleaning and coating articles that are moved through the tank. The liquid material is heated and contains a solvent which forms solvent vapors above the liquid. Condensing means are provided above the liquid to condense the vapors. One or more troughs are provided within the tank. Each of the troughs has a plurality of longitudinally spaced downwardly extending projections having openings therein through which bolts that are fixed on the sides of the tank extend. Nuts are threaded on the bolts to hold the trough removably on the tank. As need for adjustment or replacement of the trough occurs due to corrosion, the trough can be easily removed without damaging the tank.

*Description of the drawings*

Referring to FIG. 1, the apparatus embodying the invention comprises a tank 10 of generally conventional construction that includes heating means 11 for heating the liquid materials and providing solvent vapors above the liquid. A conveyor 12 carries the articles to be cleaned and coated through the liquid materials in the tank, in accordance with conventional practice. Further in accordance with conventional practice, condensing means 13 in the form of vertically spaced tubes 14 and a coil 15 are provided for condensing the vapors above the liquid in the tank.

Figure 1:
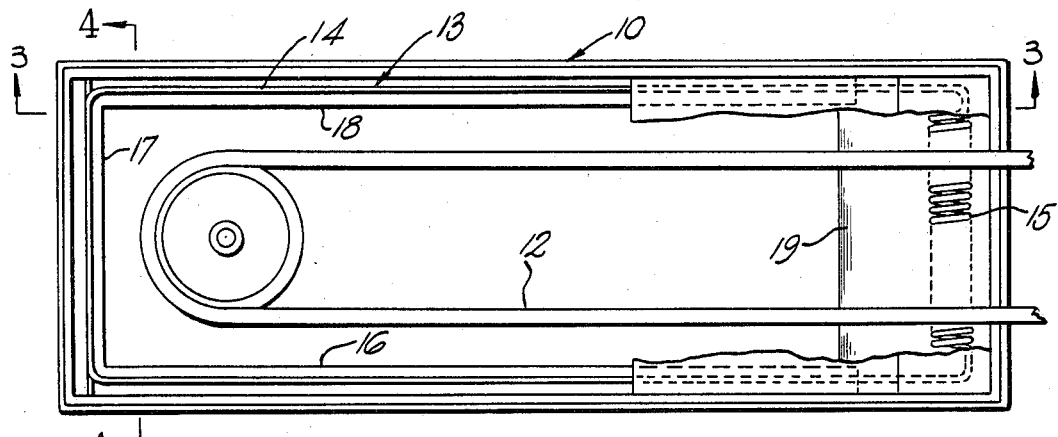
FIG. 1 is a partly diagrammatic plan view of the apparatus embodying the invention.
Figure 2:
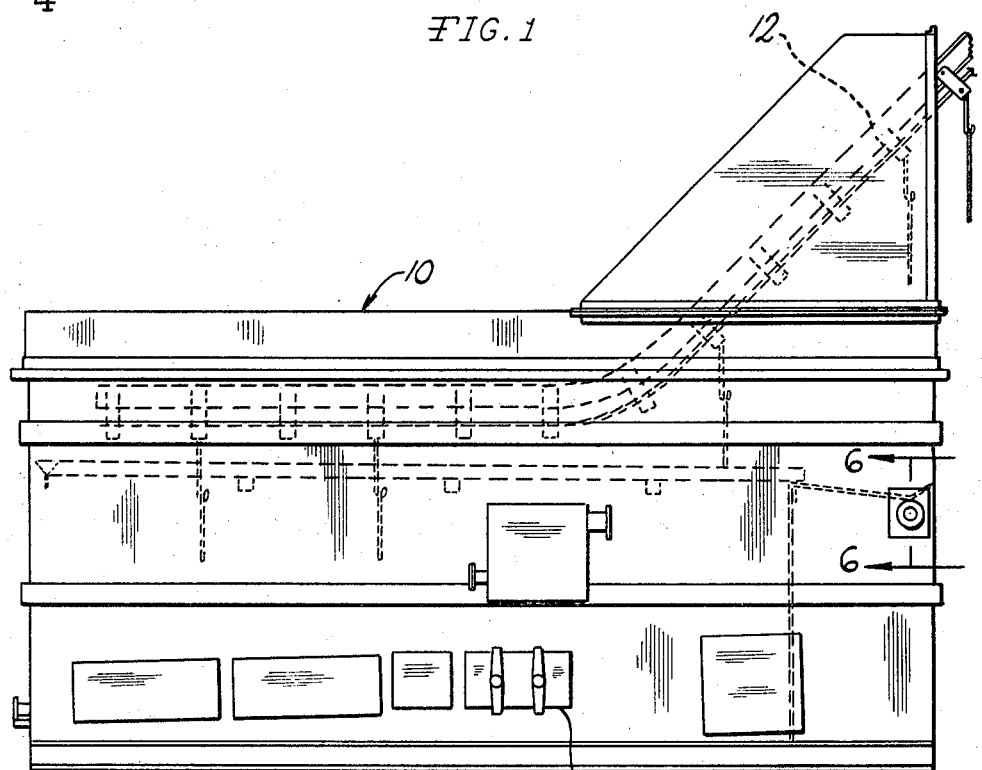
FIG. 2 is a partly diagrammatic side elevational view of the apparatus.
Figure 3:
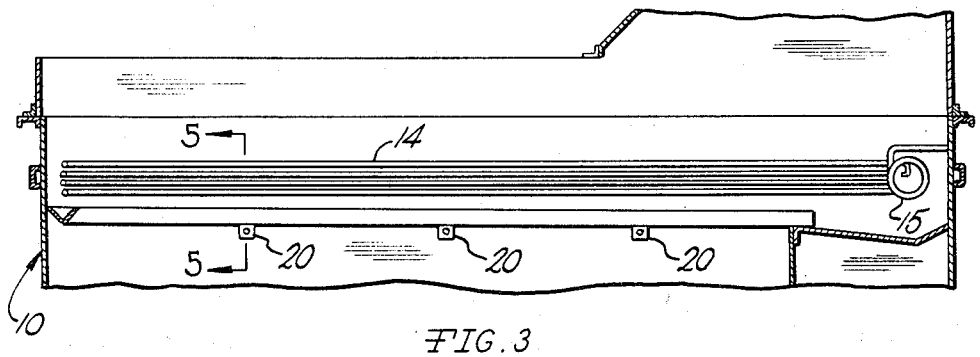
FIG. 3 is a fragmentary sectional view taken along the line 3—3 in FIG. 1.
Figure 4:
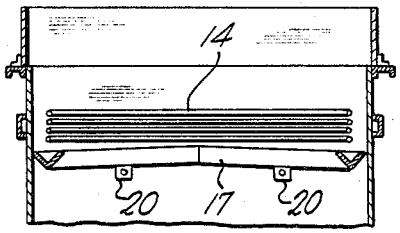
FIG. 4 is a fragmentary sectional view taken along the line 4—4 in FIG. 1.
Figure 5:
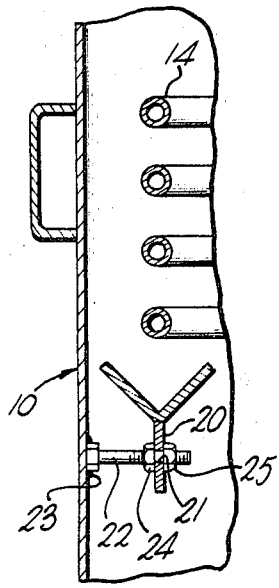
FIG. 5 is a fragmentary sectional view taken along the line 5—5 in FIG. 3.

In accordance with the invention, troughs 16, 17, 18 are provided along the three side walls of the tank with the ends of the trough portions 16, 18 extending to a collecting trough 19. Each of the trough portions 16, 17, 18 is V-shaped and has a plurality of longitudinally spaced downwardly extending plates or projections 20 (FIGS. 4 and 5) welded thereto, each of which has an opening 21 therein. Bolts 22 are welded as at 23 to the side walls of the tank 10 and extend through the openings 21. Nuts 24, 25 are threaded on the bolts on each side of plate 20 to hold the troughs in position beneath the tubes 14.

By this arrangement the position of the troughs can be easily adjusted relative to the tubes 14. Moreover as the troughs corrode in use, they may be readily removed and replaced quickly with a minimum loss of time of use of the apparatus and without any need for substantial reconstruction or tearing down of the apparatus.

Figure 6:
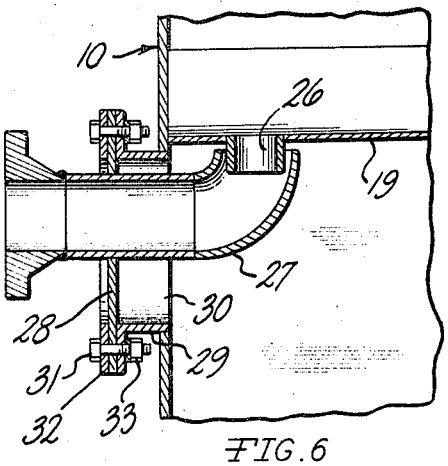
FIG. 6 is a fragmentary sectional view taken along the line 6—6 in FIG. 2.

As shown in FIG. 6, the collecting trough 19 includes a downwardly extending outlet pipe 26 adjacent one side wall of the tank. A collecting tube or elbow 27 has one end thereof communicating with the outlet pipe 26 and the other end thereof extending horizontally to the exterior of the tank. A mounting plate 28 is fixed to the tube 27 intermediate its ends and is mounted on a mounting flange 29 that surrounds an opening 30 in the side wall of the tank. Bolts 31 extend through a flange 32, plate 28 into the mounting flange 29 and nuts 33 are threaded thereon.

I claim:
1. In an apparatus for cleaning and coating articles, the combination comprising
   a tank through which articles to be treated are moved,
   heating means for heating liquid material in the tank and creating solvent vapors above the liquid material in the tank,
   condensing means above the liquid in the tank for condensing the solvent vapors,
   and at least one trough along the side of the tank for receiving the condensed vapors,
   said trough including longitudinally spaced projections extending downwardly from the underside of the trough,
   said projections having openings therein,
   a plurality of longitudinally spaced bolts fixed to the sides of the tank and extending inwardly through said openings in said projections on the underside of said trough,
   and nuts threaded on said bolts for holding said projections and, in turn, said troughs in position adjacent the inner surfaces of the walls of the tank.

2. The combination set forth in claim 1 wherein said trough includes a plurality of intercommunicating trough portions extending in the form of a U, said condensing means comprising a plurality of vertically spaced condenser tubes in overlying relation to said trough portions.

3. The combination set forth in claim 1 including a collecting trough to which said first mentioned trough extends, said collecting trough having a downwardly extending opening therein, and a discharge pipe mounted removably on the side of the tank and having a portion thereof underlying and communicating with said opening.

4. The combination set forth in claim 3 wherein said pipe forms a part of a plate, said tank having an opening in the side wall thereof, and means for mounting said plate on said opening to hold said pipe in position.

5. In an apparatus for cleaning and coating articles, the combination comprising a tank through which articles to be treated are moved, heating means for heating liquid material in the tank and creating solvent vapors above the liquid material in the tank, condensing means above the liquid in the tank for condensing the solvent vapors, and at least one V-shaped trough along the side of the tank for receiving the condensed vapors, said trough including longitudinally spaced plates extending downwardly from the underside of the trough, each said plate having an opening therein, a plurality of longitudinally spaced bolts fixed to the sides of the tank and extending inwardly through said openings in said plates on the underside of said troughs, and nuts threaded on said bolts on each side of said plates for holding said plates and, in turn, said troughs in position adjacent the inner surfaces of the walls of the tank.

6. The combination set forth in claim 5 wherein said tank includes a plurality of trough portions extending in the form of a U, said condensing means comprising a plurality of vertically spaced condenser tubes in overlying relation to said troughs.

7. The combination set forth in claim 5 including a collecting trough to which said first mentioned trough extends, said collecting trough having a downwardly extending opening therein, and a removable discharge pipe mounted removably on the side of the tank and having a portion thereof underlying and communicating with said opening.

8. The combination set forth in claim 7 wherein said pipe forms a part of a plate, said tank having an opening in the side wall thereof, and means for mounting said plate on said opening to hold said pipe in position.

References Cited

UNITED STATES PATENTS

| | | | |
|---|---|---|---|
| 1,942,355 | 1/1934 | Dinley | 134—105 XR |
| 2,273,939 | 2/1942 | Dammers | 134—105 XR |
| 2,808,064 | 10/1957 | Kearney | 134—105 XR |
| 3,274,700 | 9/1966 | Maguire et al. | 134—105 XR |

FOREIGN PATENTS 344,885  4/1960  Germany.

ROBERT L. BLEUTGE, *Primary Examiner.*

U.S. Cl. X.R.

118—429